(12) United States Patent
Weidmer (10) Patent No.: US 7,384,219 B2
(45) Date of Patent: Jun. 10, 2008

(54) TOOL WITH SELECTIVELY BIASED MEMBER AND METHOD FOR FORMING A NON-AXIS SYMMETRIC FEATURE

(75) Inventor: Stan C. Weidmer, Mason, OH (US)

(73) Assignee: Makino, Inc., Mason, OH (US)

( * ) Notice: Subject to any disclaimer, the term of this patent is extended or adjusted under 35 U.S.C. 154(b) by 0 days.

(21) Appl. No.: 10/654,328

(22) Filed: Sep. 3, 2003

(65) Prior Publication Data
US 2007/0274793 A1    Nov. 29, 2007

Related U.S. Application Data

(60) Provisional application No. 60/407,872, filed on Sep. 3, 2002.

(51) Int. Cl.
*B23B 35/00* (2006.01)
*B23D 77/06* (2006.01)

(52) U.S. Cl. .................... 408/1 R; 408/158; 82/1.5

(58) Field of Classification Search ........... 408/1 R, 408/80, 147, 154, 156, 158; 82/1.2, 1.4, 82/1.5
See application file for complete search history.

(56) References Cited

U.S. PATENT DOCUMENTS

| | | | | |
|---|---|---|---|---|
| 2,941,785 A * | 6/1960 | Kammerer | ................. | 175/286 |
| 3,126,065 A * | 3/1964 | Chadderdon | ................. | 175/269 |
| 3,622,247 A * | 11/1971 | Greenberg et al. | .......... | 408/147 |
| 3,749,187 A * | 7/1973 | Leathers | ................. | 175/269 |
| 3,888,146 A | 6/1975 | Tomenceak | ................. | 82/1 |
| 4,066,380 A * | 1/1978 | Beck et al. | ................. | 408/125 |
| 4,224,846 A * | 9/1980 | Eysel et al. | ................. | 82/158 |
| 4,289,431 A * | 9/1981 | Berstein | ................. | 408/154 |
| 4,443,140 A * | 4/1984 | Boetto | ................. | 408/147 |
| 4,569,115 A | 2/1986 | Unno et al. | ................. | 29/558 |
| 4,602,539 A | 7/1986 | Tsukiji | ................. | 82/1.2 |
| 4,648,295 A | 3/1987 | Ley et al. | ................. | 82/18 |
| 4,651,599 A | 3/1987 | Ley | ................. | 82/18 |
| 4,817,725 A * | 4/1989 | Jenkins | ................. | 166/376 |
| 4,941,782 A * | 7/1990 | Cook | ................. | 408/147 |
| 5,139,098 A * | 8/1992 | Blake | ................. | 175/269 |
| 5,368,420 A | 11/1994 | Gerk et al. | ................. | 408/156 |
| 5,427,480 A * | 6/1995 | Stephens | ................. | 408/168 |

(Continued)

FOREIGN PATENT DOCUMENTS

DE          3408325          3/1984

(Continued)

OTHER PUBLICATIONS

EPC Invitation to Correct for EP Application 03-759-219.3-3202, dated Mar. 29, 2006.

*Primary Examiner*—Monica Carter
*Assistant Examiner*—Eric A. Gates
(74) *Attorney, Agent, or Firm*—Frost Brown Todd LLC (57) ABSTRACT

A rotating cutting tool is selectively biasable in the radial direction based on the angular orientation of the cutting blade, which may be used to create a non-axis symmetric feature in a bore. The radial position of the cutting blade may be controlled by selectively pressurized fluid whose pressure is varied based on the angular orientation of the tool. A plurality of vents may be selectively covered and uncovered to vent pressurized fluid to vary the pressure thereof.

27 Claims, 13 Drawing Sheets

U.S. PATENT DOCUMENTS

| | | |
|---|---|---|
| 5,730,036 A | 3/1998 | Ozaki et al. ................... 82/1.3 |
| 5,782,585 A | 7/1998 | Bathen ........................ 408/17 |
| 5,791,409 A * | 8/1998 | Flanders .................... 166/55.8 |
| 5,865,573 A * | 2/1999 | Kress .......................... 408/57 |
| 6,227,082 B1 | 5/2001 | Hörmansdörfer et al. .... 82/1.11 |
| 6,270,295 B1 | 8/2001 | Hyatt et al. |
| 6,315,503 B1 | 11/2001 | Oswald et al. ................. 408/1 |
| 6,378,632 B1 * | 4/2002 | Dewey et al. .............. 175/269 |
| 6,536,998 B2 * | 3/2003 | Hyatt et al. ................. 408/147 |
| 6,729,810 B2 * | 5/2004 | Hyatt et al. ................. 408/1 R |
| 6,779,953 B2 * | 8/2004 | Suzuki et al. ................ 408/147 |
| 6,926,475 B2 * | 8/2005 | Kress et al. ................. 408/156 |
| 7,090,445 B2 * | 8/2006 | Woodruff et al. ............. 408/59 |
| 7,140,819 B2 * | 11/2006 | Broghammer et al. ...... 409/234 |
| 2005/0145417 A1 * | 7/2005 | Radford et al. ............... 175/57 |

FOREIGN PATENT DOCUMENTS

| | | |
|---|---|---|
| DE | 34 08 352 A | 9/1985 |
| DE | 4124538 | 7/1991 |
| DE | 41 24 538 A | 10/1992 |

* cited by examiner

TOOL WITH SELECTIVELY BIASED MEMBER AND METHOD FOR FORMING A NON-AXIS SYMMETRIC FEATURE

This application claims priority benefit of and incorporates by reference the disclosure of U.S. provisional patent application 60/407,872 for Tool With Selectively Biased Member And Method For Forming A Non-Axis Symmetric Feature, filed Sep. 3, 2002. U.S. Pat. No. 6,270,295 for Tool With Selectively Biased Member And Method Of Using The Same, issued Aug. 7, 2001, and U.S. Pat. No. 5,540,526 for Fluid Bearing Tool And Method For Forming The Same, issued Jul. 30, 1996, are incorporated herein by reference.

BACKGROUND OF THE INVENTION

U.S. Pat. No. 6,270,295 describes a tool with a selectively biased member and method of using the tool. In one or more embodiments disclosed therein, the radial position of a blade carried on the end of a rotating tool, such as a reamer or a boring bar, is controlled by fluid pressure. In particular, fluid pressure is applied to an internal bore or cavity to effect radial movement of the blade in order to control the diameter of the hole being bored.

One of the methods disclosed in U.S. Pat. No. 6,270,295 of using one of the embodiments of the tool involves controlling the blade position based on the axial position of the blade. This method produces an axis symmetrical bore. FIGS. 9, 10 and 11 of U.S. Pat. No. 6,270,295 illustrate a method which compensates for material deformation in a workpiece. The specific method described in relation to these figures addresses axial deformation in a bore, in which the workpiece bows inward near the top of the hole due to material properties inherently in the workpiece.

Figure 1:
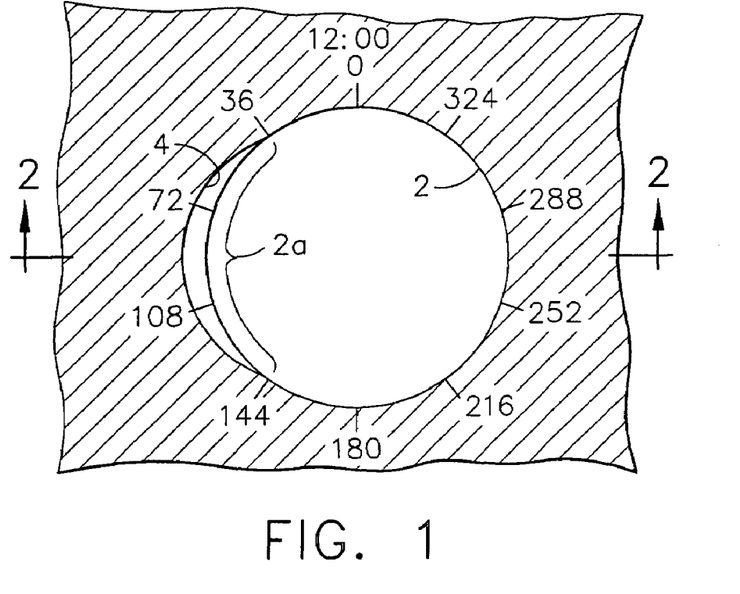
FIG. 1 is a diagrammatic top view of a non-axis symmetric bore.
Figure 2:
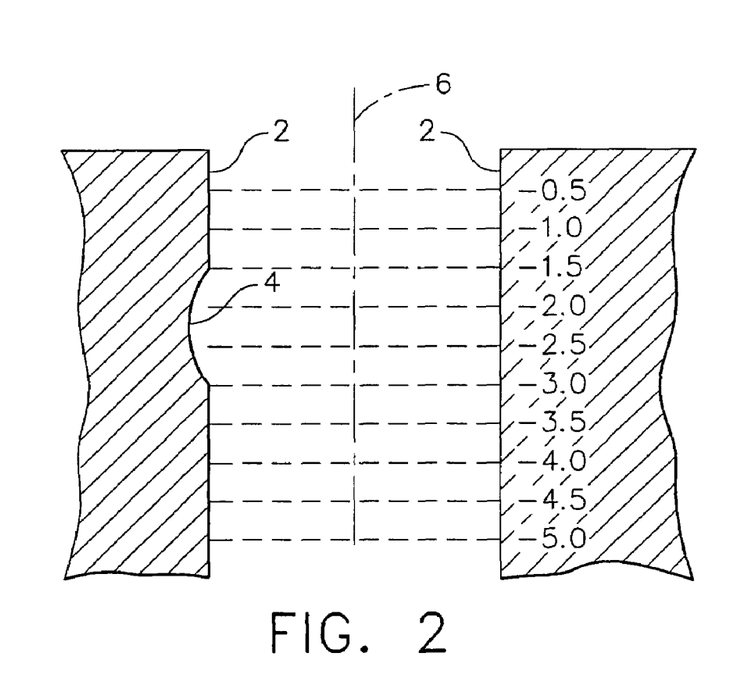
FIG. 2 is a fragmentary, diagrammatic side view of the bore of FIG. 1 taken along line 2-2 of FIG. 1.

An error can also present itself in which the radius/diameter of the bore is not constant based on angular position. FIG. 1 is a diagrammatic top view of a non-axis symmetric bore 2 in which the radius/diameter is not constant, varying based on angular position. In FIG. 1, non-axis symmetric arc 4, shown as a localized void of material extending outwardly from 36° to 144°, deviating from the perfectly circular bore represented by arc 2*a*. Non-axis symmetric arc 4 may alternatively protrude into the bore 2. As seen in FIG. 2, which is a fragmentary, diagrammatic side view of bore 2 taken along line 2-2 of FIG. 1, non-axis symmetric arc 4 may be located at any position along axis 6 of bore 2, and does not have to be longitudinally constant.

There are three basic sources of the error. 1) the non-axis symmetric arc 4 may result from manufacturing error in which a perfectly circular bore is not formed; 2) the bore may become deformed as a result of assembly, such as by way of example, distortion in a cylinder bore when the bolts holding the cylinder head are tightened, even if within specification; and 3) thermal distortion.

Figure 3A:
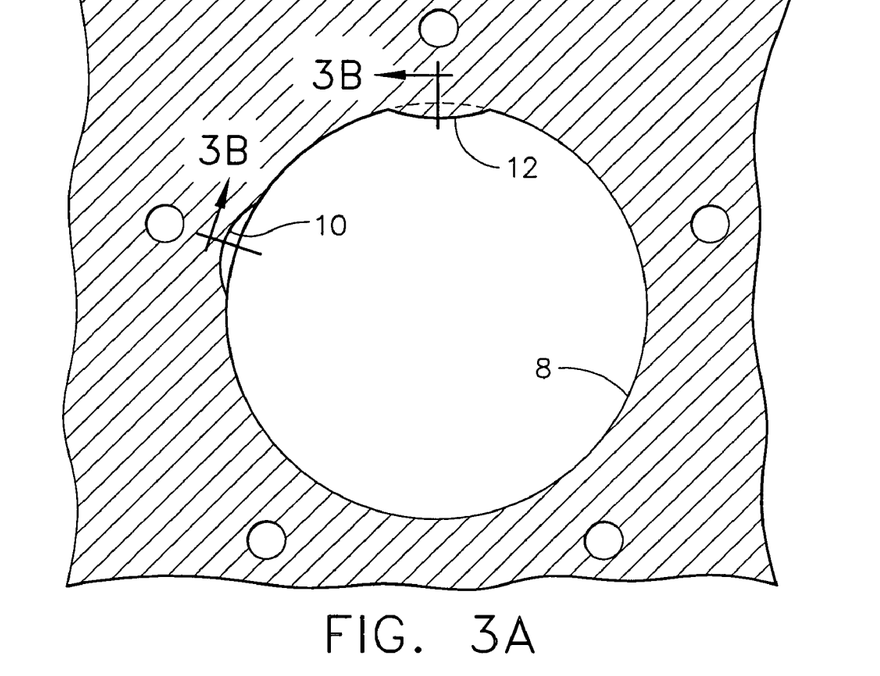
FIGS. 3A and 3B are diagrammatic top and side views, respectively, of a bore showing distortion occurring due to assembly.
Figure 3B:
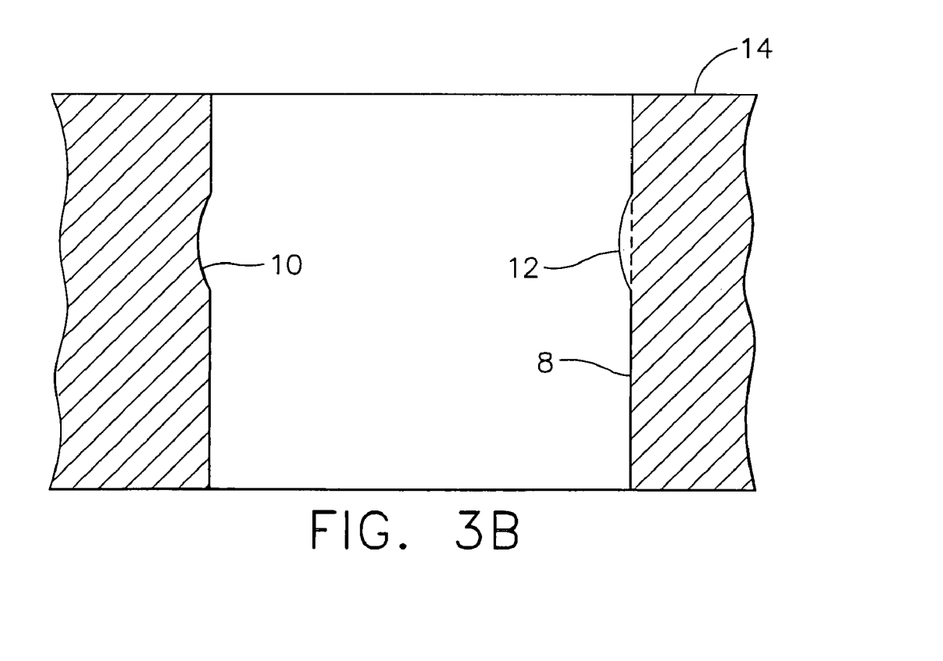
Figure 4A:
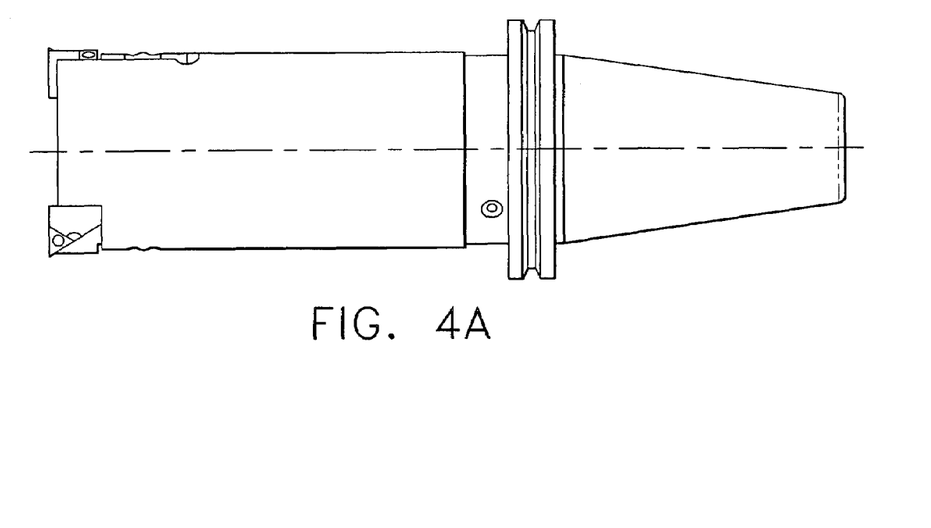
FIGS. 4A-E illustrate an embodiment of a tool with selectively biasable members, similar to the embodiments described in U.S. Pat. No. 6,270,295.
Figure 4B:
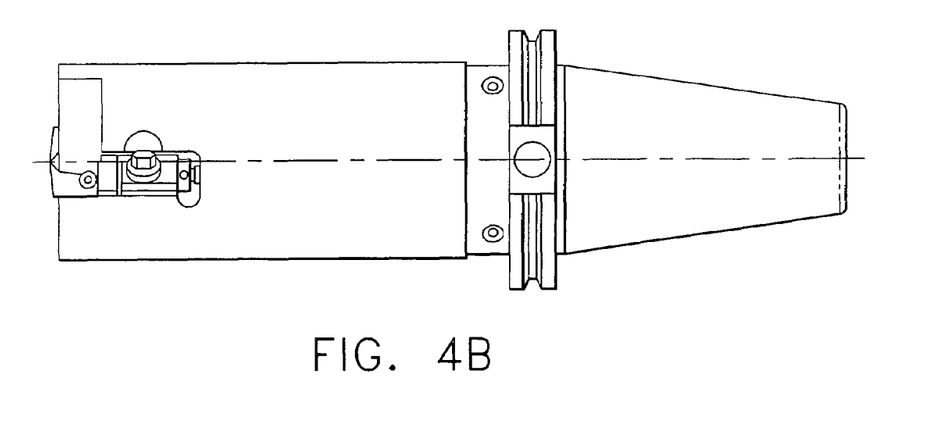
Figure 4C:
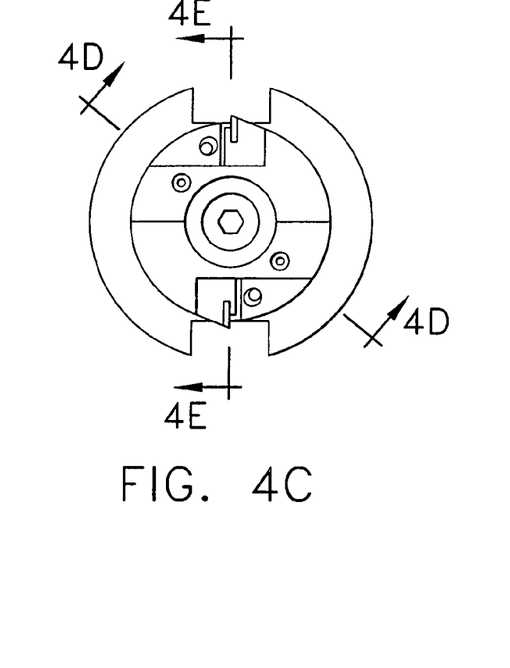
Figure 4D:
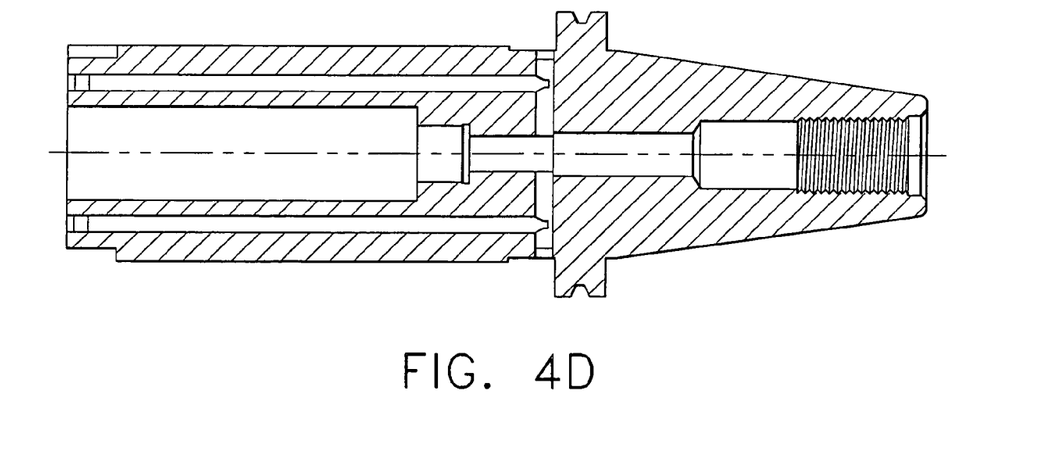
Figure 4E:
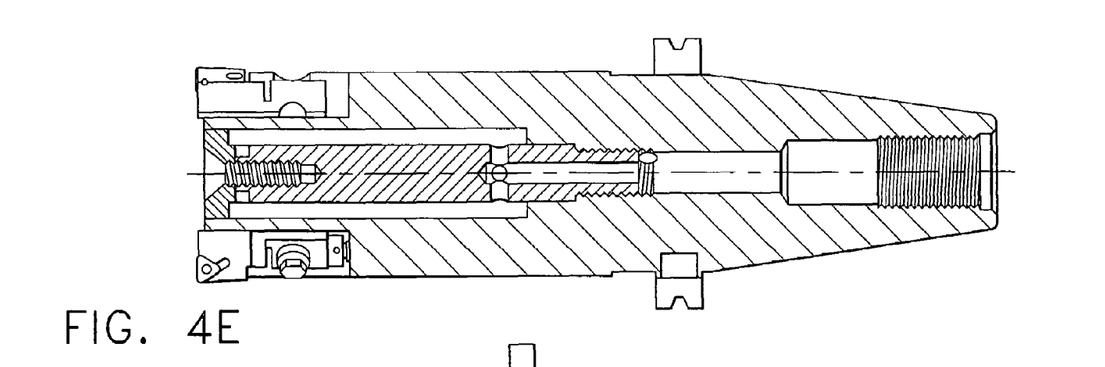

FIGS. 3A and 3B diagrammatically illustrate top and side views, respectively, of a cylinder bore 8 showing distortion occurring due to assembly. There is illustrated concave portion 10 extending outwardly and convex portion 12 extending inwardly, both of which are spaced down from surface 14 and occupy different angular positions, although at the same axial location.

Such error can be directly addressed by use of the tools and methods disclosed in U.S. Pat. No. 6,270,295, within the scope of the claims thereof. FIGS. 4A-E illustrate an embodiment of the tool, similar to the embodiments described in U.S. Pat. No. 6,270,295.

SUMMARY OF THE INVENTION

By selectively controlling the biasing of a tool with a selectively biasable member based on angular orientation and axial location of the tool, the blade or other operable surface can be controlled to desired positions based on angular orientation and axial location to over come the error. For example, an non-axis symmetric area may intentionally be introduced into a bore or other formed configuration in order to overcome errors induced by material properties, by manufacturing, by assembly, or by thermal distortion.

Although many different control instrumentalities may be utilized to control the biasing based on angular orientation and axial location of the tool, specific embodiments utilizing fluid pressure are disclosed herein, directly as well as by reference. In order to control the biasing of the cutting portion of the tool using fluid pressure, it is necessary to control the fluid pressure precisely and to synchronize the pressure with the orientation and location of the blade.

Although within the teaching of the present invention, fluid pressure may be controlled remote from the tool itself, simplicity and significant accuracy is obtained in the embodiments disclosed herein by controlling the fluid pressure immediately proximate the tool. If fluid pressure is controlled remote from the member being biased, such long fluid passageways, even when used with incompressible fluids, can produce delays and reduce the responsiveness of the system to an unacceptable level.

BRIEF DESCRIPTION OF THE DRAWING

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF EMBODIMENTS OF THE INVENTION

Figure 5:
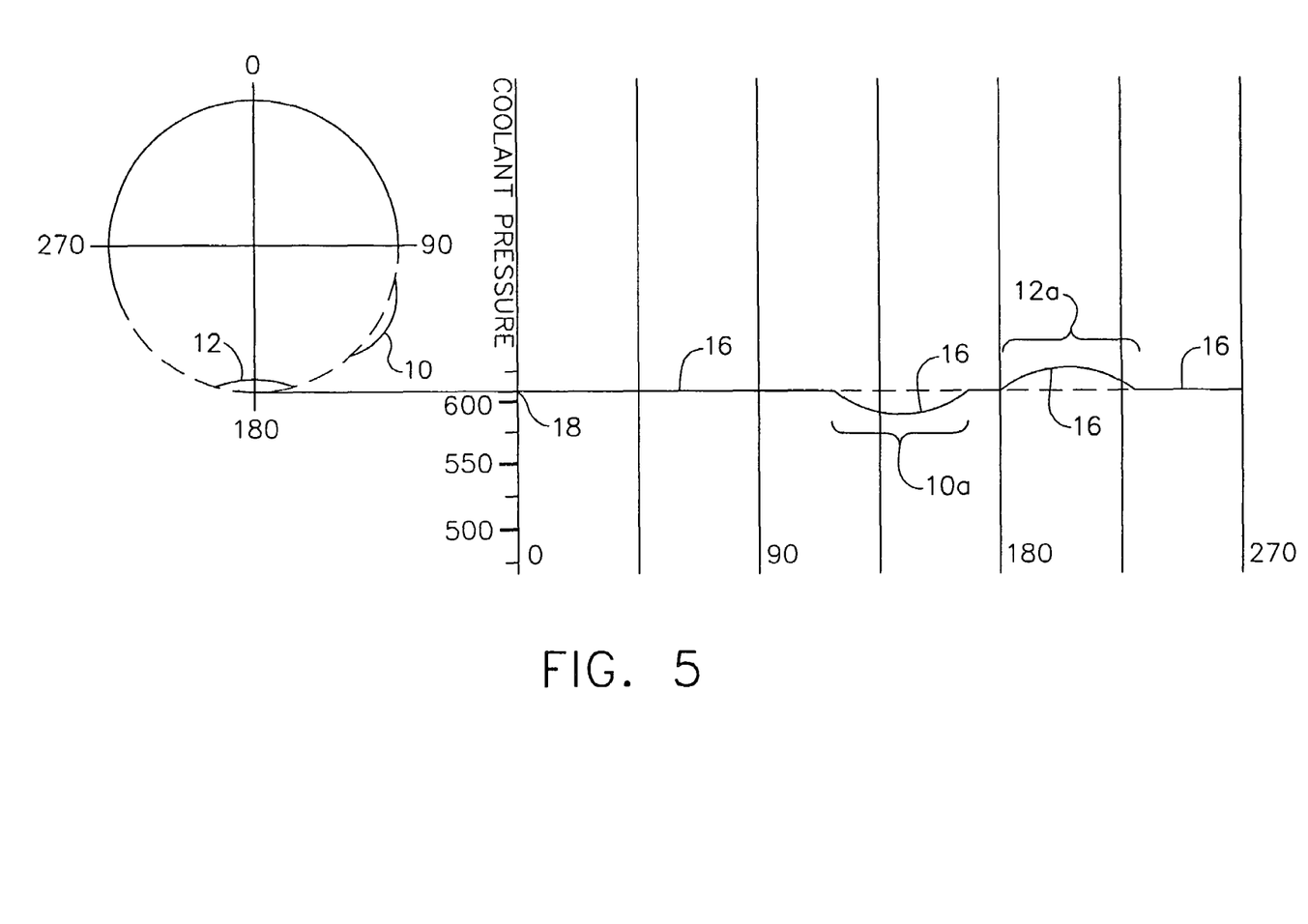
FIG. 5 diagrammatically illustrates coolant fluid pressure vs. angular orientation.
Figure 5A:
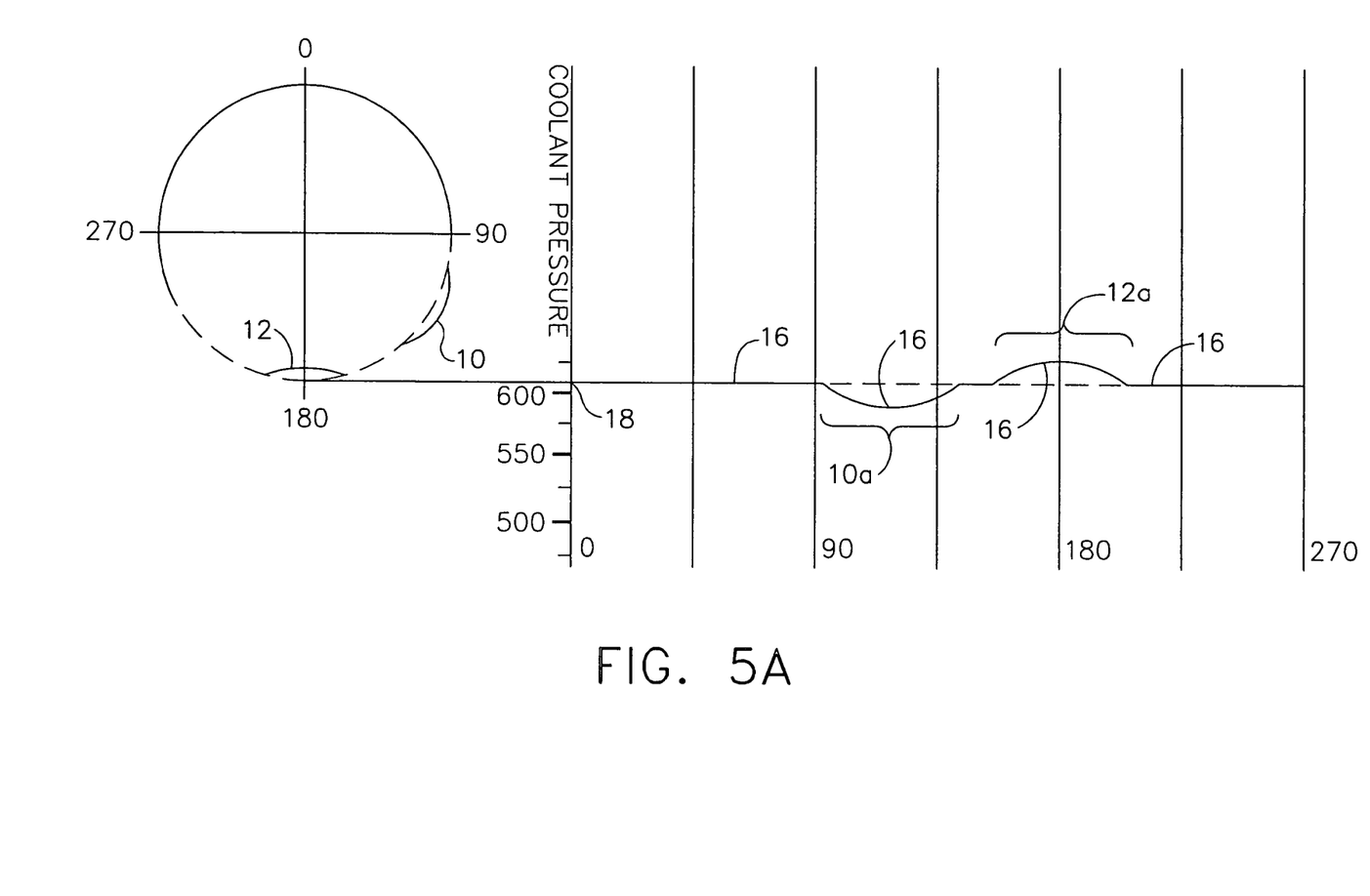

In order to compensate for protruding portion 10, as shown in FIGS. 3A and 3B, less material needs to be removed in the angular and axial region corresponding to portion 10. Similarly, more material needs to be removed in the angular and axial region corresponding to portion 12. Referring to FIG. 5, the corresponding coolant fluid pressure is illustrated at line 16. As illustrated, a nominal coolant pressure indicated at 18, slightly above 600 PSI, is the pressure necessary to maintain the blade at the nominal diameter. In order to remove less material at portion 10, the pressure is reduced at area 10a, causing the radius of the arc traveled by the blade to decrease, thereby removing less material. Similarly, in order to remove more material at portion 12, the pressure is increased in area 12a, causing the radius of the arc traveled by the blade to increase, thereby removing more material. As is inherently apparent in FIG. 5, the timing of the pressure change at areas 10a and 12a do not exactly correspond to the location of portions 10 and 12, but instead lag the actual timing of the pressure changes. FIG. 5A diagrammatically illustrates the pressure changes as more closely corresponding to the locations of portions 10 and 12.

In order to control the pressure accurately, to obtain the necessary frequency and timing response, coolant is selectively allowed to flow or vent from the tool. Although there are many ways to effect such flow control, such as electronically, in the embodiments disclosed herein, one or more vents are formed through the circumferential surface tool itself, in communication with one or more internal cavities within the tool, and the vents are selectively covered and uncovered in order to allow fluid to flow from the internal cavities, thereby immediately affecting the fluid pressure within the tool itself and concomitantly the biasing delivered to the tool and location of the blade.

In the depicted embodiments, flow from the vents is achieved by disposing one or more selectively located vent bocks, in the form of a sleeve, proximal the tool circumferential surface, and selectively covering or uncovering all or portions of the vents, thereby increasing or decreasing the coolant pressure. The vents may be formed in the tool in a wide variety of angular and axial locations. The vent blocks cooperate with the vents to form a controlled valve through which fluid flows.

Figure 6:
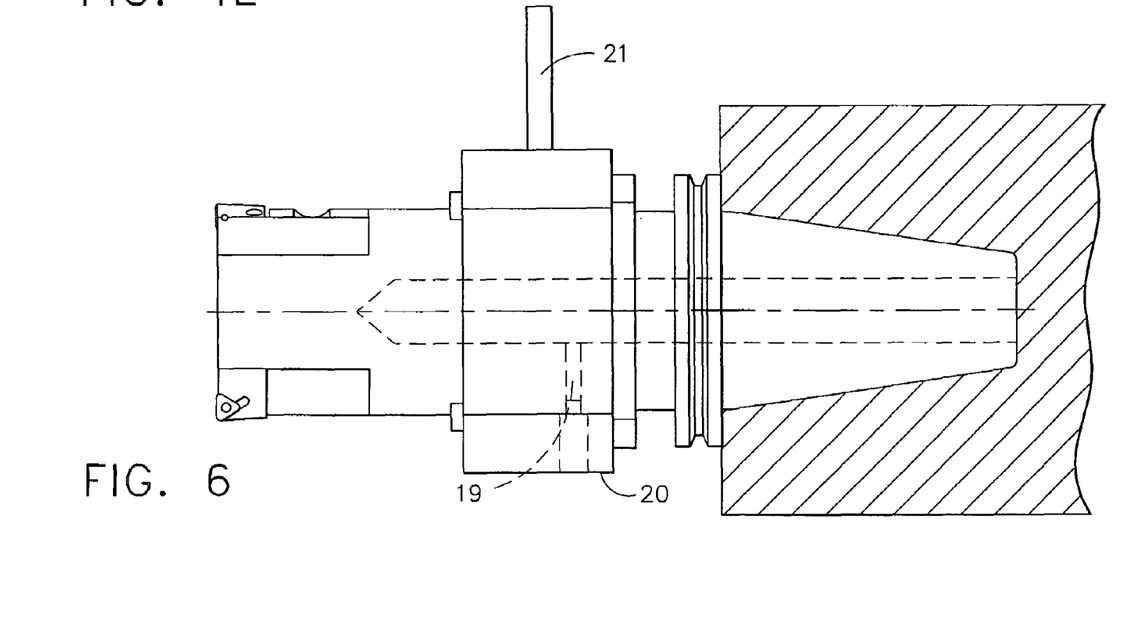
FIG. 6 diagrammatically illustrates a non-rotating sleeve vent block.

In one embodiment, a single axially extending column of a plurality of vents may be disposed in the circumferential surface of the tool, and selectively covered and uncovered at the appropriate angular position by alignment with a vent block to effect the desired biasing. In such an embodiment, as diagrammatically illustrated in FIG. 6, the vent block is a non-rotating sleeve 20 disposed about and adjacent the tool circumferential surface with a torque stop 21, with an appropriately configured corresponding vent path 19.

Figure 7A:
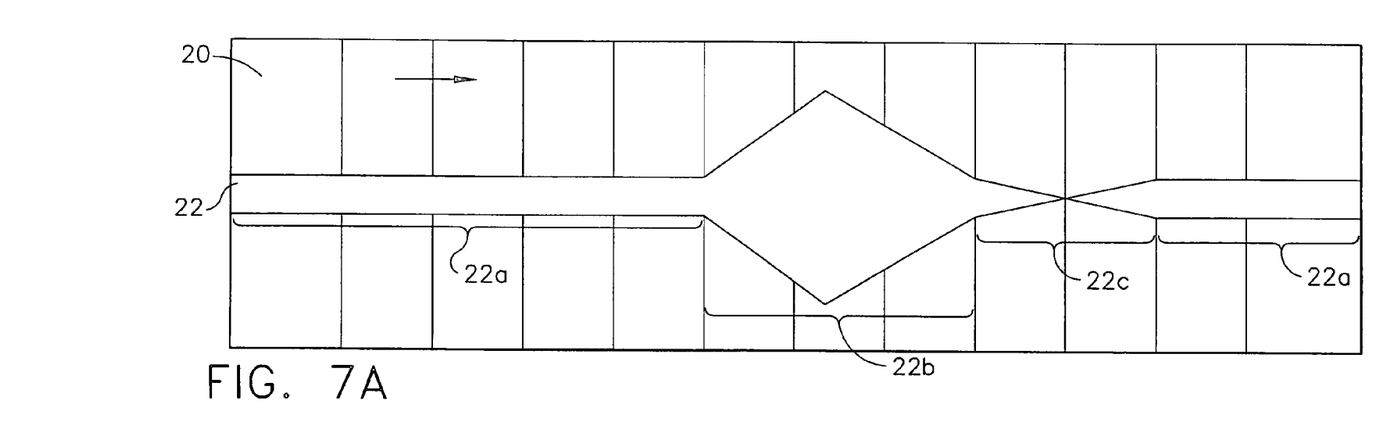
FIGS. 7A and 7B diagrammatically illustrate an "unwrapped" sleeve representing about 270° of the full 360° wrap angle.
Figure 7B:
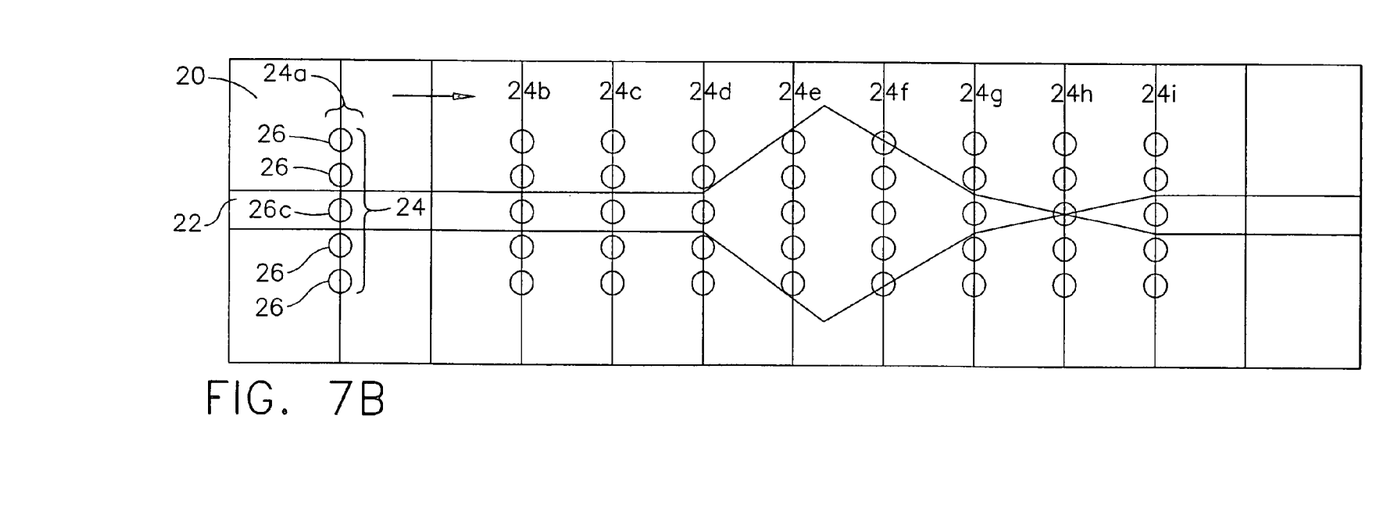

Referring to FIGS. 7A and 7B, an "unwrapped" sleeve 20 is diagrammatically shown representing about 270° of the full 360° wrap of sleeve 20. Sleeve 20 is actually cylindrical and fits around a corresponding portion of the tool, proximal the vents. Vent path 22 includes a constant, nominal pressure portion 22a, a decreased pressure portion 22b and an increased pressure portion 22c. FIG. 7B diagrammatically illustrates uncovering and covering of single column 24 of a plurality of axially aligned vents 26. As the tool rotates, the single column 24 travels through positions 24a-i relative to sleeve 20. As is illustrated, from 24a to 24d, only a single vent, vent 26c, is uncovered by sleeve 20, which is aligned with vent path 22. In this depiction, vent 26c being uncovered maintains the coolant pressure at the desired nominal pressure to maintain the biasing at the nominal level to maintain the blade at the nominal position. At 24d, vent path 22 begins to diverge into portion 22b. As the tool rotates, and column 24 advances to position 24e, additional vents are uncovered, reducing the coolant pressure. With further rotation, the vents become covered again, and at 24g, only vent 26c is uncovered. From 24g to 24h, vent 26c becomes covered, when column 24 is aligned with portion 22c, increasing the coolant pressure. At 24i, only vent 26c is uncovered, and nominal pressure is maintained until column 24 reaches 24d during the subsequent revolution.

As will be appreciated, it is necessary for the coordination between the vents and the vent path to produce proper timing of the biasing, including appropriate lead time, so that the desired amount of material is removed at the desired angular orientation to produce the non-axis symmetric feature, in this example, a bore.

Figure 8:
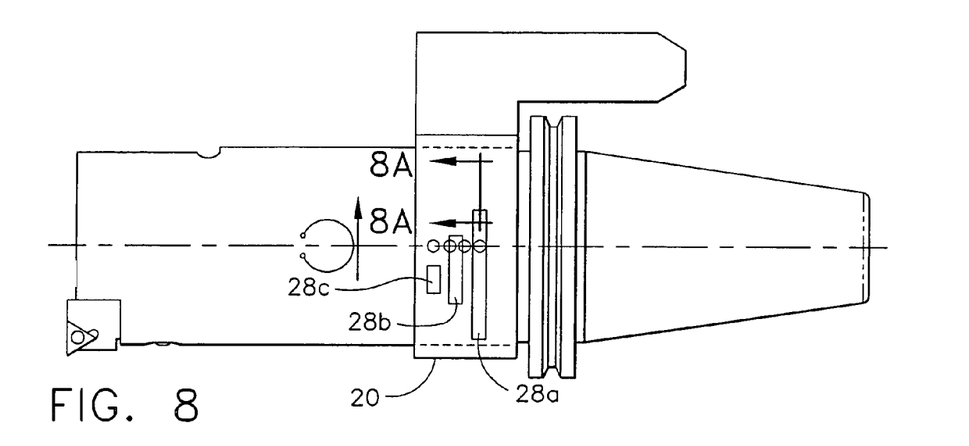
FIG. 8 diagrammatically illustrates another embodiment of a sleeve which includes a plurality of discrete slots.
Figure 8A:
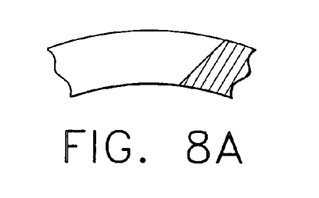
FIG. 8A is an enlarged, fragmentary cross sectional view taken along line 8A-8A of FIG. 8 illustrating an embodiment of a slot having an angled edge.

FIG. 8 diagrammatically illustrates another configuration for sleeve 20, which includes a plurality of discrete slots 28a-c. In this illustration, four vents 30 are illustrated. Slots 28a-c may be aligned with specific axially aligned vents, or may uncover adjacent vents. The respective arcuate lengths of slots 28a-c are dictated by the desired pressure profile (pressure and timing) of the coolant needed to produce the desired non-axis symmetric feature. FIG. 8A, taken along line 8A-8A of FIG. 8, illustrates an embodiment of slot 28a, showing an angled edge, which is configured based on producing the desired pressure profile, meeting the normal, well known control requirements for dampening, undershoot, overshoot, etc. It is noted that it is preferred that a nominal level of coolant venting be available for control to allow for increasing and decreasing the biasing force on the tool, and to provide a pressure range suitable to "spike" the pressure in order to achieve the desired pressure level and response to move the controlled member of the tool (in the depicted embodiment, the blade) to the desired position at the desired orientation, as well as to provide a pressure range suitable to drop the pressure sharply to effect the same response in opposite direction.

Figure 9:
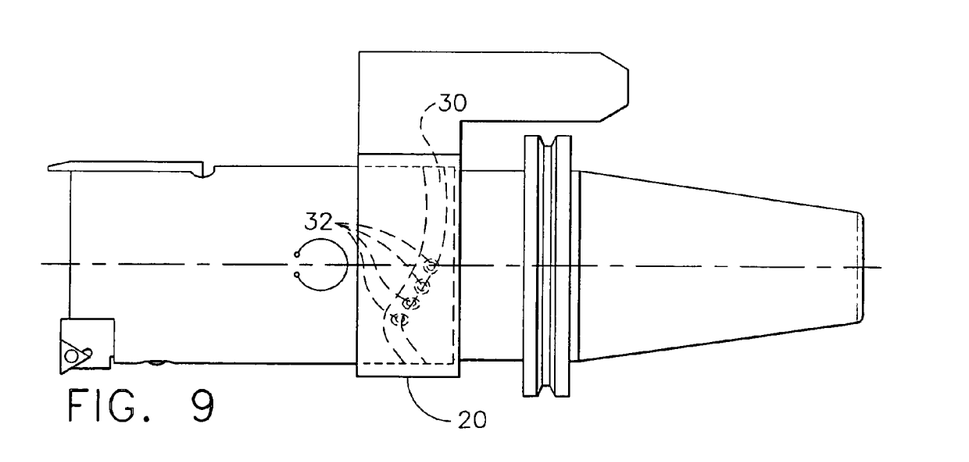
FIG. 9 diagrammatically illustrates a wave shaped vent path formed in a sleeve.
Figure 10:
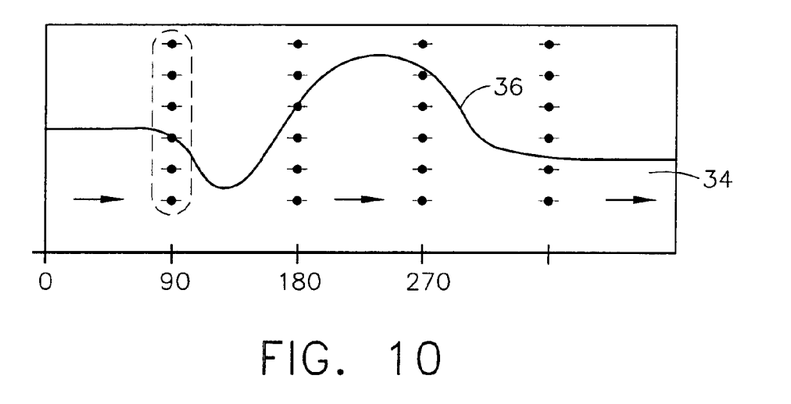
FIG. 10 diagrammatically illustrates an unwrapped sleeve 34 which presents only an one sided vent path.

Any suitable number and orientation of vents and sleeve or, more generally, vent block configurations may be used to produce the desired pressure profile. FIG. 9 diagrammatically illustrates a "wave" shaped vent path 30 formed in sleeve 20, with a plurality of non-axially aligned vents 32. FIG. 10 diagrammatically illustrates an "unwrapped" sleeve 34 which presents only an one sided vent path, where one edge 36 of sleeve 34 is curved such that sleeve 34 blocks only those vents below (in the figure) edge 36.

Figure 11:
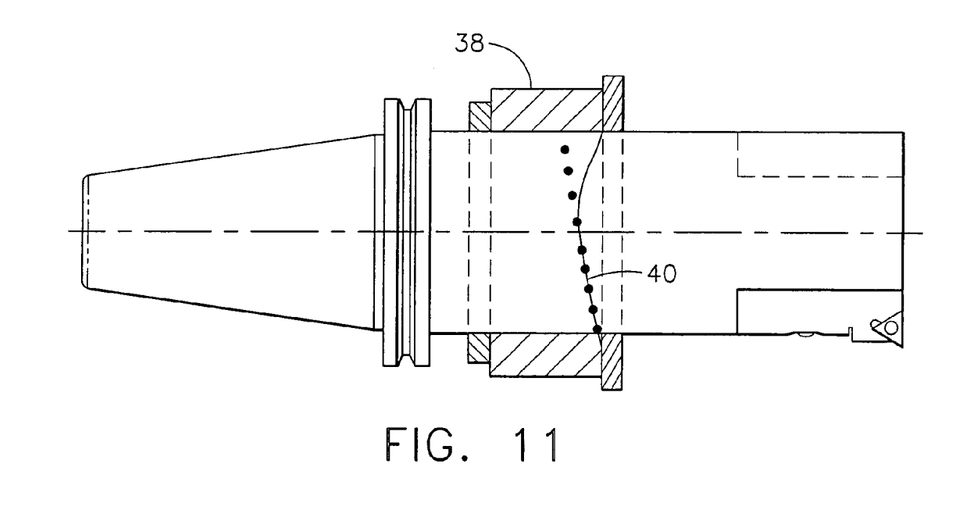
FIG. 11 diagrammatically illustrates an axially moveable sleeve.
Figure 12:
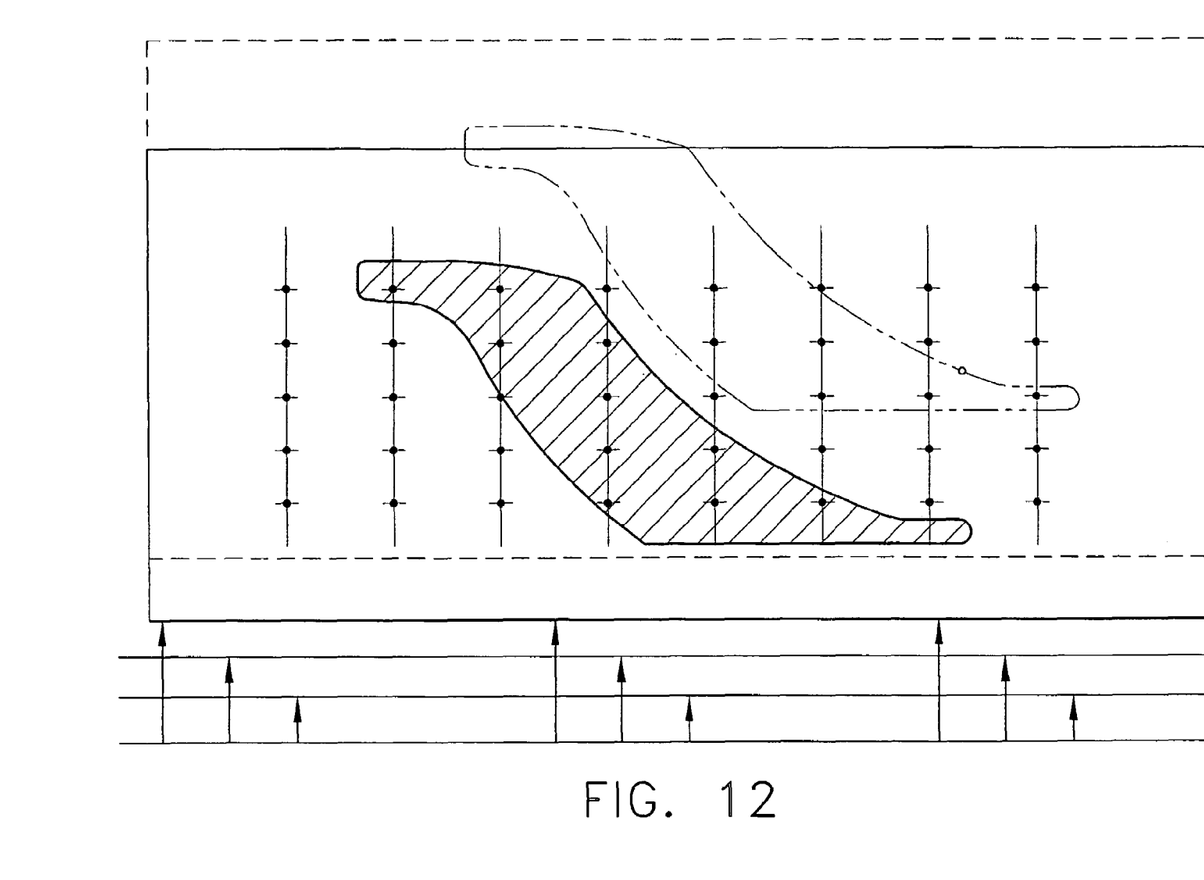
FIG. 12 diagrammatically illustrates another embodiment of an axially moveable sleeve.

FIG. 11 diagrammatically illustrates another configuration of vents and sleeve in which a plurality of vents are circumferentially disposed about an arcuate portion of the tool, with the vent centers not circumferentially axially aligned (although there may be circumferential axial overlap of the width of the vents). Sleeve 38 includes arcuate edge 40 configured to produce the desired pressure profile. In this embodiment, sleeve 38 is axially moveable, which affects the coolant pressure not only based on angular position of the tool, but on axial location of sleeve 38. With this embodiment, the angular biasing can be completely disabled while boring by moving sliding sleeve 38 to an appropriate position, at which none of the vents are uncovered, or conversely where all vents are uncovered, in either case providing constant biasing throughout the angular orientation of the tool. When a depth is reached at which a non-axis symmetric feature is desired, sleeve 38 can be moved axially into the appropriate position. The amount of biasing can be introduced slowly, i.e., "feathered" in so as not to produce a step in the bore (unless desired). FIG. 12 diagrammatically illustrates another embodiment with a different vent and vent path arrangement and sleeve design, in which the sleeve may be displaced axially.

Figure 13:
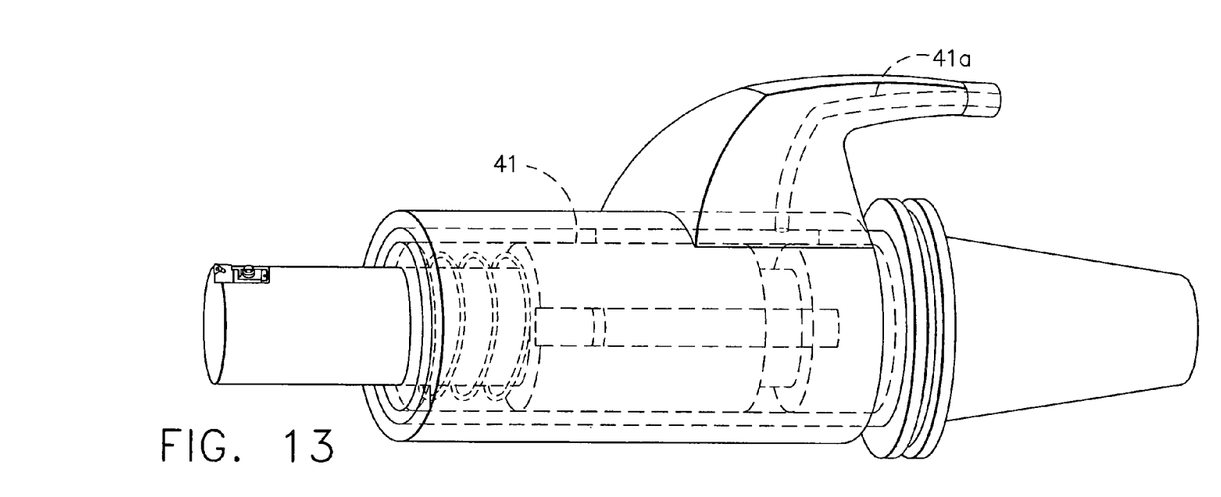
FIG. 13 diagrammatically illustrates another embodiment of an axially moveable sleeve.

FIG. 13 diagrammatically illustrates another axially moveable sleeve 41, whose axial position may be controlled by fluid pressure through internal passageway 41a. As can be seen, yet another vent and vent block arrangement is depicted.

Figure 14:
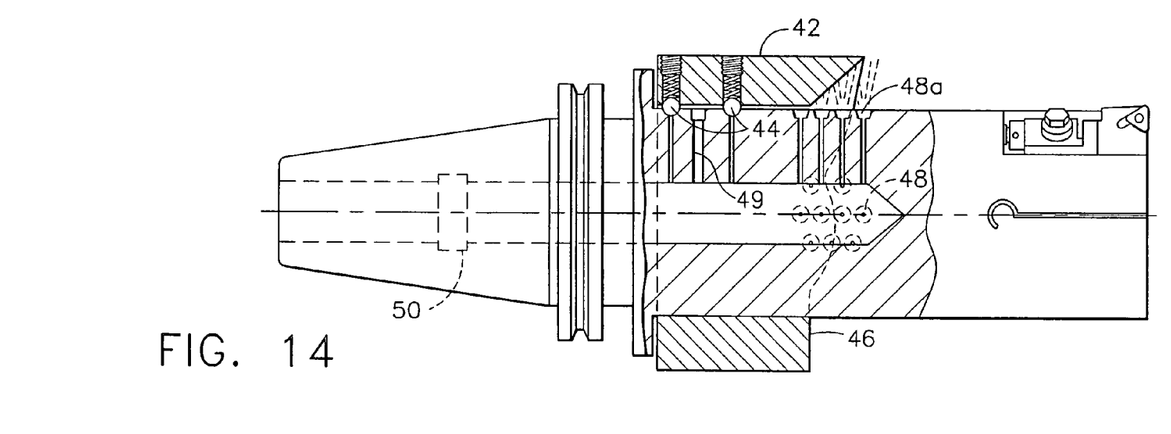
FIG. 14 diagrammatically illustrates another embodiment of cooperating vents and sleeve.

FIG. 14 diagrammatically illustrates another configuration of cooperating vents and sleeve 42. Rollers 44 in annular tracks may be used to locate sleeve 42 axially. Arcuate edge 46 controls the coolant back pressure and concomitantly the biasing of the tool. In this configuration, a plurality of vents 48 are grouped as shown, axially aligned in three columns, and circumferentially overlapping. FIG. 14 includes vent 49 which delivers fluid pressure to create a hydraulic bearing between the tool and sleeve. FIG. 14 illustrates a cross sectional shape for vents, such as at 48a, and an undercut 42a in sleeve 42, all configured to provide the desired coolant flow and press profile required to produce the desired angular dependant biasing of the tool. As will be readily appreciated, in addition to the location and grouping of vents, all physical characteristics of the vents, such as the number of vents, angle of the vents, vent diameter, cross sectional shape, shape and length of the ports leading to the vents, etc., are relevant to the dynamics of the closing and opening of the vents which act as valves, affecting coolant fluid flow therethrough. Because the vent diameters are small, filter 50 is provided on the coolant fluid inlet end of the tool in the embodiment depicted in FIG. 14.

Figure 15:
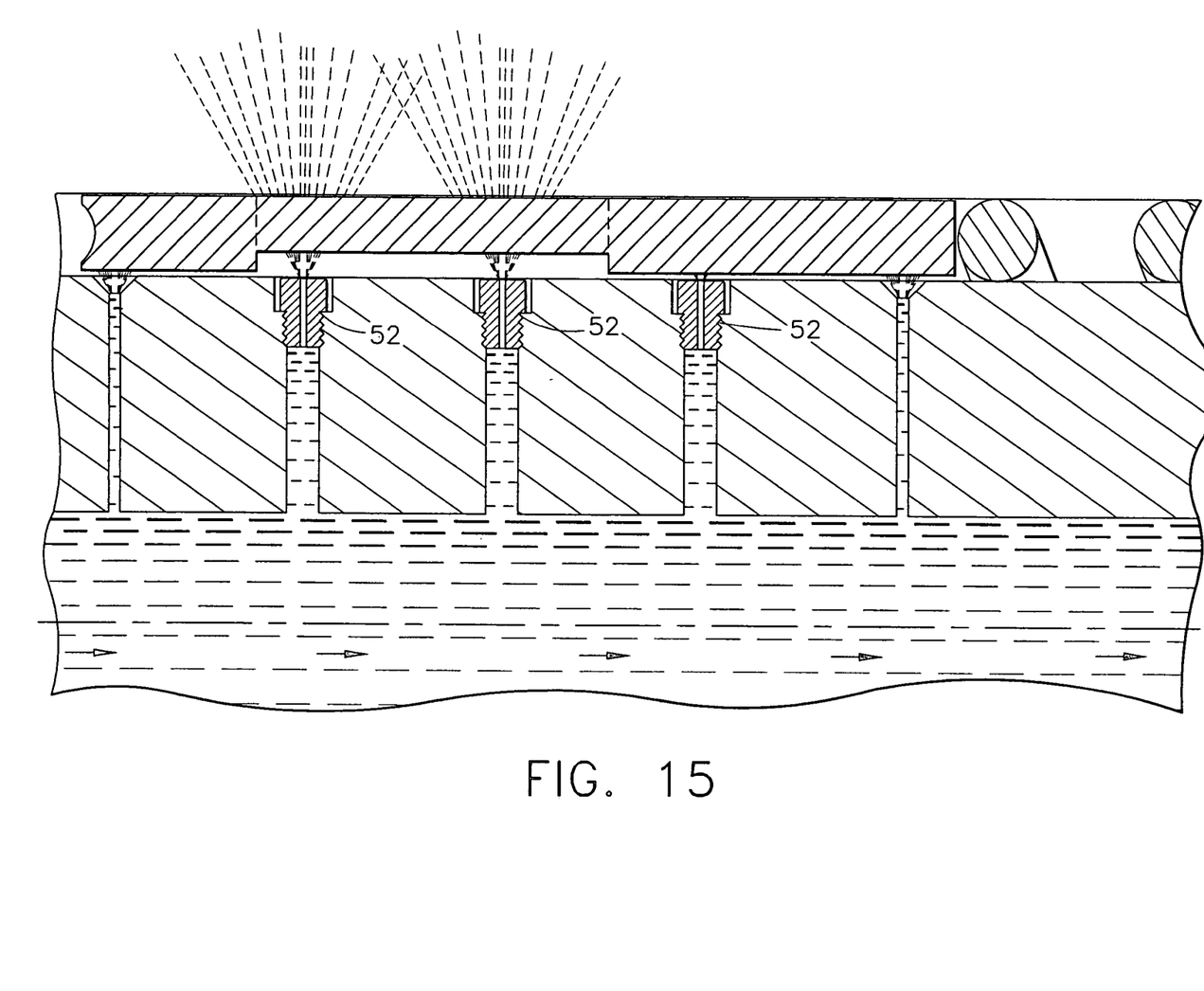
FIG. 15 diagrammatically illustrates an embodiment in which precision jets are disposed as the vent exits.

FIG. 15 diagrammatically illustrates a vent embodiment in which precision jets 52 are disposed as the vent exits. As will be readily appreciated, there are numerous venting and vent blocking techniques.

Although various arrangements of mechanical devices for controlling the coolant pressure have been described herein, any suitable method and/or structure may be used to control the angular biasing of the tool. For example, the controls may be electric, electronic, magnetic, etc., and may or may not rely on fluid pressure. The flow of fluid from the vents/valves may be controlled electrically or electronically. Of course, the fluid may be liquid or gas. Additional vents may be used to provide greater resolution of pressure control.

What is claimed is:

1. A tool for cutting material from a workpiece comprising: at least one blade member including a blade configured to cut material from the workpiece, said at least one blade member being selectively biasable to at least one of a plurality of alternative use positions; and a selective bias device configured to selectively bias said at least one blade member to at least one of a plurality of alternative use positions based on angular orientation of said at least one blade member, wherein the selective bias device comprises a selectively pressurized fluid, wherein said tool includes a conduit configured for said pressurized fluid, said conduit including one or more vents configured to allow a flow of said pressurized fluid to exit said conduit, and comprising means for selectively covering or uncovering said one or more vents as a function of the angular orientation of said tool.

2. The tool according to claim 1, comprising a plurality of rotating blade members.

3. The tool according to claim 1, wherein the fluid pressure controls which of said at least one of a plurality of alternative use positions to which said at least one blade member is biased.

4. The tool according to claim 1, wherein which of the plurality of alternate use positions to which said at least one blade member is selectively biased is a function of the pressure of said pressurized fluid.

5. The tool according to claim 1, wherein the fluid pressure is a function of the angular orientation of said tool.

6. The tool according to claim 1, wherein said means includes one or more vent blocks.

7. The tool according to claim 1, wherein said tool comprises a circumferential surface, and said one or more vents are formed in the circumferential surface of said tool.

8. The tool according to claim 7, further comprising a member configured to selectively block one or more of said vents.

9. The tool according to claim 8, wherein said member comprises a sleeve disposed adjacent said circumferential surface.

10. The tool according to claim 9, wherein said sleeve is moveable axially.

11. The tool according to claim 8, wherein said member includes at least one opening, said vents not being blocked when aligned with said at least one opening.

12. The tool according to claim 1 further comprising at least one support member configured to at least partially support the workpiece while it is being cut by the blade.

13. The tool according to claim 12 further wherein said bias device is further configured to selectively bias said at least support member to at least one of a plurality of alternative use positions based on angular orientation of said at least one support member.

14. A tool for cutting material from a workpiece, comprising at least one blade member including a blade configured to cut material from the workpiece, said at least one blade member being selectively biasable by a selectively pressurized fluid to at least one of a plurality of alternative use positions based on angular orientation of said at least one blade member, wherein said tool includes a conduit configured for said pressurized fluid, said conduit including one or more vents configured to allow a flow of said pressurized fluid to exit said conduit, and comprising means for selectively covering or uncovering said one or more vents as a function of the annular orientation of said tool.

15. The tool according to claim 14, comprising a plurality of rotating blade members.

16. The tool according to claim 14, wherein the fluid pressure controls which of said at least one of a plurality of alternative use positions to which said at least one blade member is biased.

17. The tool according to claim 14, wherein which of the plurality of alternate use positions to which said at least one blade member is selectively biased is a function of the pressure of said pressurized fluid.

18. The tool according to claim 14, wherein the fluid pressure is a function of the angular orientation of said tool.

19. The tool according to claim 18, wherein said means includes one or more vent blocks.

20. The tool according to claim 14, wherein said tool comprises a circumferential surface, and said one or more vents are formed in the circumferential surface of said tool.

21. The tool according to claim 20, further comprising a member configured to selectively block one or more of said vents.

22. The tool according to claim 21, wherein said member comprises a sleeve disposed adjacent said circumferential surface.

23. The tool according to claim 22, wherein said sleeve is moveable axially.

24. The tool according to claim 21, wherein said member includes at least one opening, said vents not being blocked when aligned with said at least one opening.

25. The tool according to claim 14 further comprising at least one support member configured to at least partially support the workpiece while it is being cut by the blade.

26. The tool according to claim 25 further wherein said at least one support member is further configured to be selectively biasable by a selectively pressurized fluid to at least one of a plurality of alternative use positions based on angular orientation of said at least one support member.

27. A method of using a tool to cut material from a workpiece, the method comprising the steps of: a. providing a tool comprising at least said blade member being selectively biasable to at least one of a plurality of alternative use positions; b. rotating the blade member and the workpiece relative to one another so that the blade removes material from the workpiece; c. selectively biasing said at least one blade member to at least one of a plurality of alternative use positions based on angular orientation of said at least one blade member relative to said workpiece, further comprising the step of causing pressurized fluid to bear on said at least one blade member in order to selectively bias said at least one blade member, further comprising the step of causing the pressure of said pressurized fluid to vary based on the angular orientation of said at least one blade member relative to said workpiece, wherein said tool includes a circumferential surface, and wherein the step of varying the pressure comprises the step of selectively covering and uncovering any of a plurality of vents formed in said circumferential surface.

* * * * *